United States Patent [19]

Kosaka et al.

[11] 4,066,810

[45] Jan. 3, 1978

[54] HEAT PRINTING SHEET AND HEAT PRINTING METHOD

[75] Inventors: Yujiro Kosaka; Masaru Uemura, both of Tokyo; Hitoshi Kuroki, Yokohama; Kanji Otomo, Machida; Yoshiaki Terauchi, Ichikawa; Yasuo Arai, Kawasaki, all of Japan

[73] Assignee: Toyo Soda Manufacturing Co., Ltd., Japan

[21] Appl. No.: 672,515

[22] Filed: Mar. 31, 1976

[30] Foreign Application Priority Data

Apr. 1, 1975 Japan .................................. 50-39459

[51] Int. Cl.[2] ........................ C09D 11/10; B32B 3/00; B32B 5/16; B32B 27/06

[52] U.S. Cl. .................................... 428/195; 101/150; 106/20; 106/22; 106/32; 106/30; 427/385 B; 427/369; 428/207; 428/334; 428/337; 428/483; 428/913; 428/500; 428/522; 428/914

[58] Field of Search ................ 101/152, 150; 427/372, 427/385, 369; 428/195, 220, 334, 337, 339, 480, 483, 500, 518, 519, 521, 914, 913, 522, 207; 106/20, 23, 30, 32, 22

[56] References Cited

U.S. PATENT DOCUMENTS

| | | | |
|---|---|---|---|
| 3,063,367 | 11/1962 | Nystrand et al. | 101/152 |
| 3,516,904 | 6/1970 | Klinker | 428/337 |
| 3,738,265 | 6/1973 | Saueressig | 101/152 |
| 3,922,445 | 11/1975 | Mizuno et al. | 428/500 |
| 3,924,041 | 12/1975 | Miyayama et al. | 428/913 |

*Primary Examiner*—Thomas J. Herbert, Jr.
*Assistant Examiner*—R. Eugene Varndell, Jr.
*Attorney, Agent, or Firm*—Oblon, Fisher, Spivak, McClelland & Maier

[57] ABSTRACT

A heat printing sheet having a pattern of a hot melt ink composition on a base, the improvement comprising using a hot melt ink composition which comprises 5–60 wt. parts of a base polymer of ethylene-vinyl acetate copolymer having 5–50 wt. % of the vinyl acetate content and 4–1000 g/10 min. of a melt index or a mixture of said ethylene-vinyl acetate substituted with 10–60 wt. % of the other polymer; and 20–80 wt. parts of a tackifier selected from terpene resins, hydrogenated dicyclopentadiene resins, lower styrene resins, rosins, rosin polyol esters, hydrogenated rosin and rosin polyol esters and alicyclic hydrocarbon resins and 0.1–30 wt. parts of a pigment or dye, and the hot melt ink composition is melted at 80°–250° C and is coated on an engraved roll and is instantaneously printed on a base of synthetic polymer film having 10–100 of a thickness and smooth surface under 0.5–10 Kg/cm$^2$ (gauge) to form the pattern of the hot melt ink composition having 10–3000 of a thickness.

9 Claims, No Drawings

HEAT PRINTING SHEET AND HEAT PRINTING METHOD

BACKGROUND OF THE INVENTION

1. Field of the Invention:

The present invention relates to a heat printing sheet which is used for printing a pattern or mark made of a hot melt ink composition by coating the melted hot melt composition (colored heat-meltable composition) on an intaglio roll having engraved pattern or mark and pressing a base of synthetic polymer film having a nonporous and flat surface and having high flexibility, with the coated intaglio roll. (plate cylinder). When the pattern or mark of the heat printing sheet is printed on the substrate, the heat printed sheet is heated, pressed or pressed under heating from the back surface of the heat printed sheet to print the pattern or mark on the substrate.

2. Description of the Prior Art:

Heretofore, solvent-type printing sheets and sublimatable-dye type printing sheets have been known as heat printing sheets. Solvent-type printing sheets are prepared by printing the desired pattern on a nonadhesive layer of a paper base by silk screen techniques or offset techniques and coating an adhesive layer on th printed substrate, to give three layers, the nonadhesive layer, the printed ink layer and the adhesive layer. These layers are respectively formed by coating each with solvent solutions. Accordingly, organic solvents are used in the steps of the production of the solvent-type printing sheet, the danger of firing and a pollution caused by vaporization of large amounts of the organic solvents can occur and the process is complicated because of the three steps. Moreover, since the adhesive layer is formed on the outer surface of the solvent-type printing sheet, a blocking sheet is placed between the adhesive layer and the back surface of other heat printing sheets in the pile which is inconvenient. On the other hand, the sublimatable dye-type printing sheet is prepared by printing a sublimatable dye so as to dye a fabric by the sublimation of the dye by heat-treatment. In the sublimation of the dye, the printing should be carried out at high temperatures, thus dyeability and heat-resistance of the fabric are required and only fabrics made of special fibers, such as polyester fibers, can be used as the substrate. The patterns printed by using the solvent-type printing sheet and the sublimatable dye-type printing sheet are flat and have no depth and lack continuous tone density.

SUMMARY OF THE INVENTION

It is an object of the present invention to provide a heat printing sheet which can be applied to various substrates including not only fabrics made of specific fibers but all types of fabrics, wood, leathers, ceramics, glass and the like.

It is another object of the present invention to provide a heat printing sheet which provides patterns having depth, fashionable and decorative appearance.

Another object of the present invention is to provide a heat printing sheet which can easily provide continuous tone patterns.

Further, yet another object of the present invention is to provide a heat printing sheet which provides fine clear lines and continuous tone with variation of depth and clear density of the tone as the pattern or mark on the substrate.

These objects of the invention have been attained by using a hot melt ink composition which comprises a base polymer having a main component of an ethylene-vinyl acetate copolymer having 5–50 wt. % of vinyl acetate content and 4–1,000 preferably 5–500 g/10 min. of melt index (hereinafter referring to as EVA) and a tackifier having hot tackiness and a pigment or dye or a mixture thereof, and if necessary, a wax and a filler.

DETAILED DESCRIPTION OF THE PREFERRED EMBODIMENTS

It is possible to add other base polymers, such as polyethylene, styrene-butadiene copolymer and the like to the EVA. The styrene-butadiene copolymer prepared by solution polymerization is especially preferred, as said styrene-butadiene copolymer. The other base polymers such as ethylene-acrylate copolymers, ethylene-isobutyl acrylate copolymers, cellulose derivatives, polyesters, polymethylmethacrylate, polyvinyl ethers, polyurethanes and the like can also be added to EVA. These other polymers can be admixed with EVA to form the base polymer. The base polymer usually comprises 40–95 wt. %, preferably 70–95 wt. % of EVA in said cases. The addition of EVA improves the miscibility of the base polymer, the tackifier and the wax in the hot melt ink composition and improves the adhesive and cohesive properties of the hot melt ink composition of the substrate for printing it.

The tackifiers have hot tackiness and can be terpene resin, hydrogenated dicyclopentadiene resins, lower styrene resins (molecular weight of 300–3,000), rosins, rosin polyol esters, hydrogenated rosins, hydrogenated rosin polyol esters, alicyclic hydrocarbon resins. It is possible to add cumarone-indene resins, phenol resins, xylene resins, hydrocarbon resins (other than the alicyclic hydrocarbon resins) and the like, to the above resins. In order to impart an adhesive property and clarity to the hot melt ink compositions, it is effective to add a rosin type tackifier such as rosins, rosin polyol esters, etc. Typically, from 5–60 wt. parts of the base polymer are blended with 20–80 wt. parts of the base polymer are blended with 20–80 wt. parts of the tackifier.

The pigment or dye for coloring the composition can be selected from pigments and dyes which impart the desired color. It is preferable to use pigments which have a high heat resistance, such as carbon black, titanium oxide, Quinacridone red, Phthalocyanine blue, Isoindoline Yellow and the like. The pigment or dye for coloring is usually added at a ratio of 0.1–30 wt. parts to 5–60 wt. parts of the base polymer and 20–80 wt. parts of the tackifier. When the amount of the pigment or dye is more than 30 wt. parts, the molten viscosity of the hot melt ink composition is remarkably increased which causes inferior workability.

The addition of a wax decreases the molten viscosity of the hot melt inkcomposition and improves the workability in the printing operation for printing on the base. When the pattern of the hot melt ink composition containing a wax is printed from the hot printing sheet to the substrate, the hot melt ink composition is more easily removed from the base and printed on the substrate. The waxes used in the composition preferably include petroleum waxes, such as parrafin waxes having a melting point of 100° F–220° F, coal waxes such as Fisher Tropsch wax which has a molecular weight of 500–1500; plant waxes having a molecular weight of 400–4000; polyolefin waxes having a molecular weight of 100–10,000. It is possible to prepare various hot melt ink composition having the desired melting point by selecting the proper wax. In the hot melt ink composition having a low viscosity, 10–60 wt. parts of the wax is added to 5–60 wt. parts of the base polymer.

When heat resistance is required for the applications of the heat printing sheet, an antioxidant is added.

It is also possible to add suitable inorganic or organic filler. In order to impart good flexibility the hot melt ink composition, it is preferable to add a plasticizer.

A synthetic polymer film is used as the base for printing the hot melt ink composition in preparing the heat printing sheet. It is preferable to use a synthetic polymer film having a nonporous, flat surface and which has high flexibility. Suitable synthetic polymer films include polyester film, polyethylene film, cellophane and the like. The thickness of the synthetic polymer film is in the range of 10–100μ, preferably 20–50μ. It is optimum to use polyester film from the viewpoints of printability, heat resistance and the like. The film is required to have a certain strength for pressing the film under contacting it with the intaglio roll in the printing of the hot melt ink composition. When the thickness of the film is less than 10μ, the strength of the film is not sufficient and the size stability is not enough, which causes inaccurate printing because of elongation of the film. When the thickness of the film is more than 100μ, the flexibility of the film is inferior and causes unsatisfactory contact with the intaglio roll which results in inferior printability.

The manufacture of the heat printing sheets of the invention will be illustrated.

The base polymer, comprising a main component of EVA, is blended with the tackifier, the pigment or dye and if necessary the wax, the antioxidant and the filler to prepare the hot melt ink composition. The hot melt ink composition is melted at 80°–250° C, preferably 100°–180° C and is coated on the intaglio roll or plate having the desired engraved pattern. The engraved pattern can be prepared by the conventional method of manufacturing gravure printing rolls or plates. The synthetic polymer film is instantaneously contacted and pressed with the intaglio roll or plate having the coated and melted hot melt ink composition under the pressure of 1.5–10 Kg/cm² (gauge). When the pressure is lower than 0.5 Kg/cm²(G), the printability of the melted hot melt ink composition from the intaglio roll or plate is inferior.

When the time for contacting is too long or the pressure is higher than 10 Kg/cm² (G), the pattern is disadvantageously deformed. The thickness of the hot melt ink composition printed on the base is usually 1–300μ, preferably 20–120μ. When the thickness of the composition is less than 10μ, the pattern is disadvantageously blurred, when reprinting the pattern to the substrate. When the thickness of the composition is more than 300μ, the clarity of the pattern is lost because of the pressure given from the back surface of the heat printing sheet in the case reprinting the pattern under heat-press. In order to print a pattern of high clarity, it is preferable that the thickness of the hot melt ink composition be from 10–120μ. The invention will be further illustrated by certain examples.

EXAMPLE 1:

In a stainless steel tank equipped with a stirrer, 40 wt. parts of an ethylene-vinyl acetate copolymer (28 wt. % of the vinyl acetate content) having a melt index of 40 g/10 min. (hereinafter referred to as an EVA copolymer), 35 wt. parts of hydrogenated rosin pentaerythritol ester and 25 wt. parts of polyethylene wax having a molecular weight of 4000 were melted and blended. A 10 wt. parts of each of yellow red or blue pigment was added to 100 wt. parts of said molten mixture and total mixture was melt-blended at 180° C for 2 hours to obtain a hot melt ink composition. The yellow hot melt ink composition was charged in an ink pan of a photogravure type coater equipped with the ink pan and a doctor of printing roll heated with a heater, and a yellow continuous tone pattern was printed on a polyester film with the yellow hot melt ink. Then, the red and blue patterns composition were printed with the red and blue hot melt ink compositions respectively on the polyester film by the same manner. A black hot melt ink composition was prepared by melt-blending 20 wt. parts of EVA (28% of the vinyl acetate content; a melt index of 150 g/10 min.), 50 wt. parts of hydrogenated rosin glycerine ester, 30 wt. parts of a hydrogenated dicyclopentadiene resin and 3 wt. parts of black pigment. The black pattern was also printed with the black hot melt ink composition on the polyester film, whereby a heat printing sheet having fine continuous patterns was prepared. The printed pattern surface of the heat printing sheet was plied on a fabric (acryl fiber of Japanese Industrial Standard L 0803) and heat-pressed from the back surface by a heat press machine whereby a fine continuous tone pattern was clearly reprinted on the fabric.

EXAMPLE 2

The same pattern was reprinted on each fabric made of polyester, cotton, nylon, vinylon or silk of Japanese Industrial Standard L 0803 by using the heat printing sheet of Example 1 whereby each fine continuous tone pattern was clearly printed on each fabric.

EXAMPLE 3

The following tests were conducted by using the acryl fiber fabric having the fine continuous tone pattern of Example 1. The results are as follows.

| Test | Test Method | Result |
|---|---|---|
| Fastness to washing | *1 Practical test 10 cycle | Fading 4 grade<br>Dirt 5 grade |
| Fastness to sweat | JIS L 0848 (A - 2)<br>JIS L 0822 | Fading 5 grade<br>Dirt 5 grade to alkali and acid |
| Fastness to sun-light | JIS L 0841 direct sun-light exposure | After 20 hours exposure in outdoor higher than 5 grade |
| Fastness to rubbing | JIS L 0849<br>JIS L 0823 (dry method) | Dirt 5 grade |

*1 A sample was washed with a solution of 200 cc of a commercial detergent in 20 liter of water in a washing machine, for 15 minutes and was washed with water for 15 minutes and the washed sample was dehydrated for 2 minutes and dried at 50° C as one cycle.

It is clear from the table, fastnesses to washing, sweat, sun-light and rubbing of the sample were excellent.

REFERENCE 1

In accordance with the method of Example 1, the yellow, red, *b* and black hot melt printing ink compositions were respectively printed on a paper by the photogravure type coater. The fine parts of the pattern were blurred whereby the resulting heat printing sheet had not clear pattern. When the pattern on the paper was reprinted on the fabric of acryl fiber of JIS L 0803, the hot melt ink compositions were permeated into the paper at the reprint. The reprinted pattern was unclear and has low tone. When the fabric having the pattern was washed for 10 cycles by the washing machine, the light part of the continuous tone pattern was faded to be white.

EXAMPLE 4

The pattern of the heat printing sheet of Example 1 was reprinted on a paper by a heat press machine whereby the fine continuous tone was clearly reprinted on the paper.

What is claimed as new and desired to be secured by Letters Patent of the United States is:

1. A heat printing sheet which is prepared by the process consisting essential of a. melting a hot melt ink at a temperature of 80°-250° C;

b. coating said hot melt ink on an engraved roll and instantaneously printing said hot melt ink on a synthetic polymer film having a thickness of 10-100μ and a smooth surface under a gauge pressure of 0.5-10 Kg/cm² to form a pattern of hot melt ink having a thickness of 10-300μ;

wherein said hot melt ink composition comprises:

5-60 weight parts of a base polymer of an ethylenevinyl acetate copolymer having 5-50 weight percent of the vinyl acetate content and 4-1000 g/10 min. of a melt index or a mixture of said ethylene-vinyl acetate and 5-60 weight percent of at least one member selected from the group consisting of styrene-butadiene copolymer, ethylene-acrylate copolymer, ethylene-isobutyl acrylate copolymer, cellulose derivatives, polyesters, polymethylmethacrylate; polyvinyl ethers and urethane;

20-80 weight parts of a tackifier selected from terpene resins, hydrogenated dicyclopentadiene resins, lower styrene resins, rosins, rosin polyol esters, hydrogenated rosin and rosin polyol esters and alicyclic hydrocarbon resins;

0.1-30 weight parts of a pigment or dye.

2. In a method of heat printing a pattern onto a substrate which comprises plying said substrate with a heat printing sheet and applying heat and pressure, the improvement which comprises using the heat printing sheet of claim 1.

3. The heat printing sheet of claim 1, wherein the base is a polyester film having a thickness of 10-100μ.

4. The heat printing sheet of claim 1, wherein two or more hot melt ink compositions are respectively heat-printed to form a continuous tone pattern.

5. The heat printing sheet of claim 1, wherein the hot melt ink composition is printed by a photogravure type coated equipped with an ink pen and a doctor heater.

6. In hot printing a pattern of a hot melt ink composition onto a base, the improvement which comprises using a hot melt ink composition comprising:

5-60 wt parts of a base polymer of ethylene-vinyl acetate copolymer having 5-50 wt % of the vinyl acetate content and 4-1000 g/10 min of a melt index or a mixture of said ethylene-vinyl acetate substituted with 5-60 wt % of at least one member selected from the group consisting of styrene-butadiene copolymer, ethylene-acrylate copolymer, ethylene-isobutyl acrylate copolymer, cellulose derivatives, polyesters, polymethylmethacrylate, polyvinyl ethers and urethane;

20-80 wt parts of a tackifier selected from terpene resins, hydrogenated rosin and rosin polyol esters and alicyclic hydrocarbon resins;

0.1-30 wt parts of a pigment or dye, the holt melt ink composition is melted at 80°-250° C and is coated on an engraved roll and is instantaneously printed on a base of synthetic polymer film having a thickness of 10-100μ and smooth surface under 0.5-10 kg/cm² (gauge) to form the pattern of the hot melt ink composition having a thickness of 10-300μ.

7. The hot printing method of claim 6, wherein the base is a polyester film having a thickness of 10-100μ.

8. The hot printing method of claim 6, wherein two or more hot melt ink compositions are respectively heat-printed to form a continuous tone pattern.

9. The hot printing method of claim 6, wherein the hot melt ink composition is printed by a photogravure type coater equipped with an ink pen and a doctor heater.

* * * * *